March 18, 1941.  H. D. NEWHART  2,234,975
MOTION CHECKING DEVICE
Filed Oct. 8, 1938   2 Sheets-Sheet 1

INVENTOR.
HARRY D. NEWHART
BY George B. White
ATTORNEY.

March 18, 1941.   H. D. NEWHART   2,234,975
MOTION CHECKING DEVICE
Filed Oct. 8, 1938   2 Sheets-Sheet 2
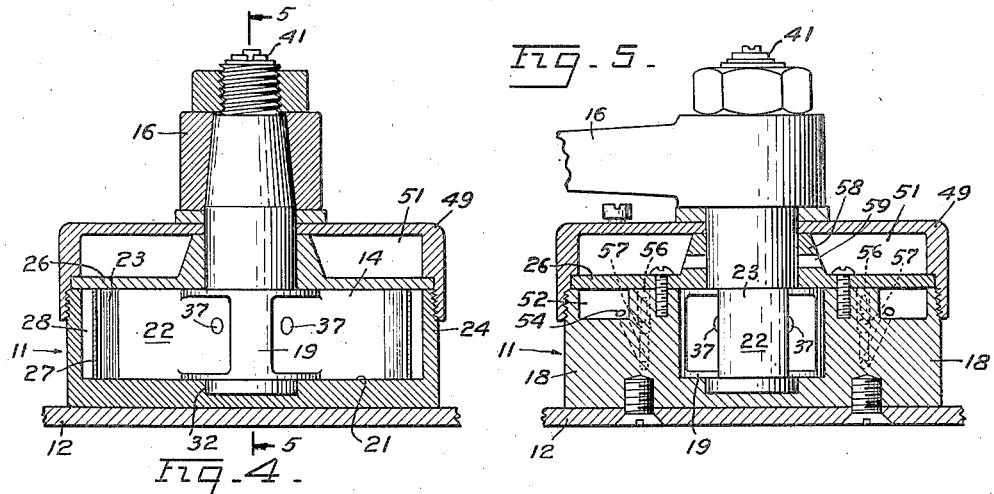
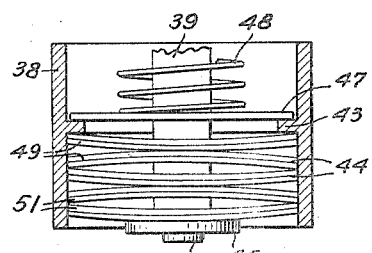
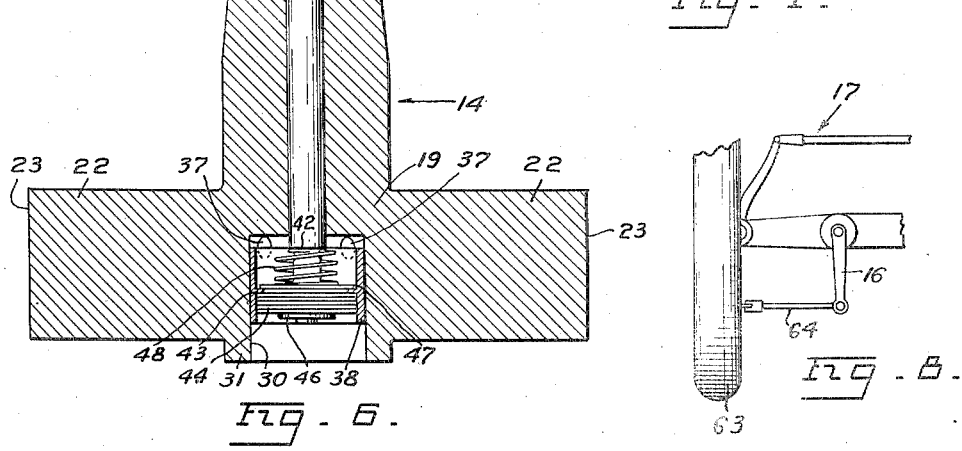
INVENTOR.
HARRY D. NEWHART
BY George B. White
ATTORNEY.

Patented Mar. 18, 1941

2,234,975

UNITED STATES PATENT OFFICE 2,234,975

MOTION CHECKING DEVICE

Harry D. Newhart, San Anselmo, Calif.

Application October 8, 1938, Serial No. 234,052

11 Claims. (Cl. 280—90)

This invention relates to vibration dampeners or motion checking devices.

An object of this invention is to provide a vibration dampener which effectively resists any shimmy or vibratory movement but does not in any way retard or hinder normal operative motion of the connected parts.

Another object of this invention is to provide a vibration dampener which is automatically adjustable according to changes of temperature, and which is adjustable to an initial resistance conforming to the degree of dampening required.

An embodiment of my invention is clearly illustrated in the accompanying drawings wherein:

Fig. 4 is a sectional view, the section being taken on lines 4—4 of Fig. 2.

Fig. 5 is a sectional view, the section being taken on lines 5—5 of Fig. 4.

Fig. 6 is a sectional detail view of the piston of the device with the adjustable by-pass in it.

Fig. 7 is a fragmental sectional detail view showing the by-pass control of my device.

Fig. 8 is a plan view of my device connected to the wheel of a vehicle.

Figure 1:
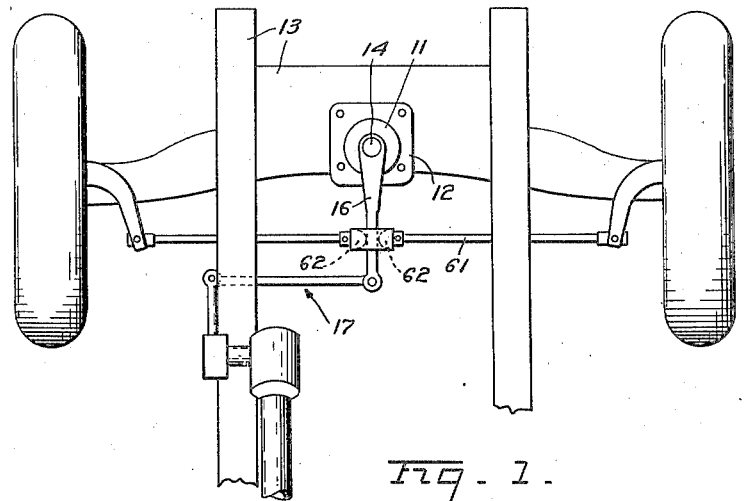
Fig. 1 is a plan view of the device as applied to the steering mechanism of a vehicle.

In its general organization my invention includes a casing 11 which is fixed on a bracket plate 12 on a stationary element, such as the frame or chassis 13 of a vehicle or automobile. A piston 14 movable in the casing 11 is connected by means of an arm 16 to an element movable relatively to said stationary element 13, for instance to a steering mechanism 17 of a vehicle or automobile. The connection between the casing 11 and the piston 14 is such that the piston 14 is prevented from jerky, periodic vibratory movement but it is allowed to move freely with normal operating motion required between the connected parts.

The casing 11 has a pair of opposed journal blocks 18 between which the hub 19 of the piston 14 is journaled substantially at right angles to the bottom 21 of the casing 11. The hub 19 of the piston 14 and the journal blocks 18 divide the casing 11 into two compartments. A wing 22 extends to each side of the piston hub 19 into the respective compartments of the casing 11. The outer end 23 of each piston wing 22 is flared and curved so as to travel in spaced parallel relation to the inner periphery of the casing 11. Each piston wing 22 is of the same height as that of the circular wall 24 of the casing 11 so that the wings 22 ride on the bottom 21 of the casing 11 and a top plate 26 on the top of the casing wall 24. The casing 11 is filled with suitable fluid, such as oil, and the piston wings 22 oscillate freely in said quiescent body of fluid in the casing 11.

Figure 2:
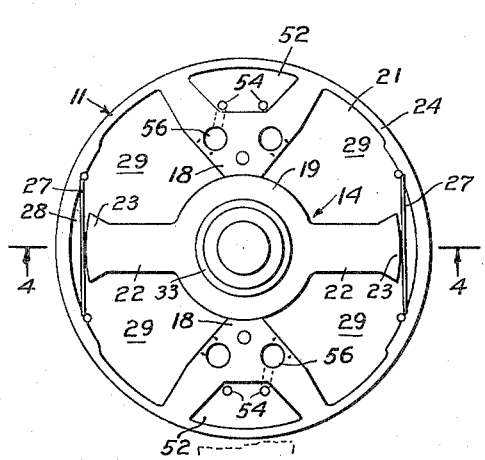
Fig. 2 is a plan view of the device with the cover or top removed.
Figure 3:
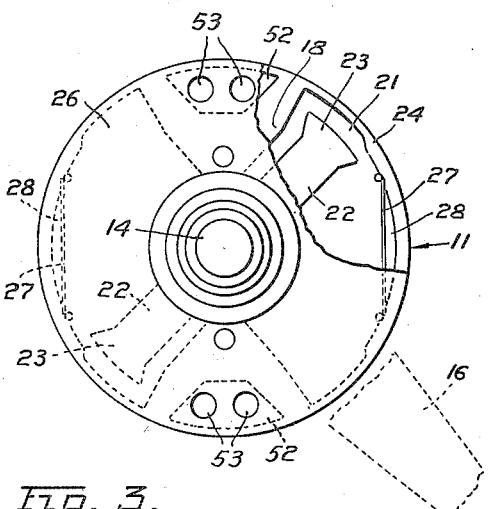
Fig. 3 is a plan view of the device, the cover being partly broken away and the piston being in turned position.

Usually it is desirable to prevent vibration of relatively movable parts only in one position. For instance in automobile steering mechanisms it is primarily desirable to prevent wheel shimmy in the usual straight away position. In my device means are provided to resist vibration of the piston wings 22 from a certain critical position. In this illustration the wing position halfway between the journal blocks 18 corresponds to the straight, forward position of the wheels of the vehicle. For this purpose stops are provided opposite the ends of the piston wings 22 in said forward position, as shown in Fig. 2. A diaphragm plate 27 is secured substantially in the position of a chord of the inner periphery of the casing wall 24 at right angles to said halfway position of the piston wings 22. It is to be noted that a small space 28 is provided behind each diaphragm plate 27. The arc of the ends 23 of the piston wings 22 determines the length of movement during which free movement of the piston 14 is resisted.

The diaphragm plates 27 are so spaced that the arcuate ends 23 of the piston wings 22 are pressed in close contact with the respective diaphragm plates 27 in said straight forward position. In this position therefore the diaphragm plates 27 coact with the piston wings 22 to separate each compartment of the casing 11 between the journal blocks 18 into a pair of compression chambers 29, in other words the fluid on the opposite sides of each piston wing 22, being unable to escape from the path of the wing 22, resists any piston movement. If there would be no escape for the fluid from one side of the wing 22 to the other then the piston 14 would be effectively locked in said position in the casing 11.

Fluid is allowed to escape from one side of each piston wing 22 to the other by means of a by-pass mechanism which is so arranged as to resist the vibratory, shimmy, movements, but to allow by-pass at a normal predetermined rate of movement. It is to be noted of course that after the piston 14 is moved out of its initial position shown in Fig. 2 then, and then only, the ends 23 of the piston wings 22 move spaced from the casing wall 24 and freely in the fluid.

The by-pass mechanism is located in a recess 30 in the piston hub 19. The recess 30 opens into a boss 31 extended below the lower level of the piston wings 22. The boss 31 is journalled in a bearing 32 in the casing bottom 21. A shaft 33 extends from the piston hub 19 and the arm 16 is secured to the threaded outer end of the piston shaft 33. A hole 34 extends from the top of the by-pass recess 30 through the shaft 33. The outer end of the hole 34 is threaded, and it also has a counter-sunk thread at 36 in its outermost portion.

Immediately adjacent the top of the recess 30 there are four by-pass apertures 37. Each aperture 37 extends radially to the outside of the hub 19 to one side of the respective piston wings 22. Thus there is an aperture 37 leading from each side of each piston wing 22 into the top of the by-pass recess 30. The apertures 37 allow fluid to escape from one compression chamber 29 into the next as the piston wings 22 are oscillated. As the piston wing 22 is urged toward and into one compression chamber 29 it exerts pressure on the fluid in its path and it creates suction in its wake. The fluid escapes through the apertures 37 and the recess 30 into the chamber 29 in the wake of the piston wing 22. By limiting the opening of the apertures 37 the escape of fluid can be limited so that it will resist any sudden, jerky reciprocating oscillation or vibration, but will allow piston movement at a desired operating speed of movement.

The by-pass is controlled by a valve sleeve 38 slidably positioned in the by-pass recess 30. The valve sleeve 38 is cylindrical and fits the periphery of the recess 30 so that it can be slid over the by-pass apertures 37. To render the by-pass adjustable to varying conditions the valve sleeve 38 is adjustably mounted on an adjusting bar 39 rotatably and slidably held in the shaft hole 34. The outer end of the bar 39 is threadedly secured into the outer end of the shaft hole 34 and is held in any adjusted position by means of a lock nut 41 threaded into the countersunk thread 36. The lower or inner end of the bar 39 is reduced in diameter so as to form a shoulder 42. The valve sleeve 38 has an annular flange 43 projecting inwardly at about half way between the ends of the sleeve 38. The flange 43 rests on a series of bi-metal discs 44 which latter in turn rest on a washer 46 fixed on the lower end of the adjusting bar 39. A disc 47 rests on the flange 43 and is urged downwardly by a coil spring 48 around the reduced end of the adjusting bar 39. The upper end of the spring 48 bears against the shoulder 42 on said bar 39. Thus the valve sleeve 38 is adjustably supported on the adjusting bar 39 so that it is urged by the spring 48 from above unto the bi-metal discs 44.

Each disc 44 is made of two layers of different metals united together and dished toward the center. The metals so united are so selected that they expand and contract differently under the influence of heat, thereby causing a change in the curvature or dishing of each disc. It is preferable that the metal which expands or elongates or contracts faster should be on the convex surface of each disc 44. In this illustration the outer layer of each disc 44 is a brass plate 49 and the inner layer is an invar plate 51. When there is an increase of temperature the bimetallic discs 44 bulge and push the valve sleeve 38 upward to cover the by-pass apertures 42 to the desired degree corresponding to the usual increase in fluidity of the oil under heat. When the temperature lowers the discs 44 contract and flatten and the spring 48 urges the valve sleeve 38 to follow the flattening discs downwardly thereby to uncover the by-pass apertures 42. The series of discs 44 simultaneously bulging or flattening result in quick movement and more sensitivity of adjustment. The initial opening of the by-pass apertures 42 is accomplished, to suit conditions, by threading the adjusting bar 39 into or out of the shaft hole 34 thereby to move the valve sleeve 38 away from or over the by-pass apertures 42 respectively.

In order to prevent breakage of the device when unduly large force is suddenly applied to the piston 14, the diaphragms 27 are flexible at high pressure to give enough to allow sufficient oil to escape from one pressure chamber into the other. However the diaphragms 27 are sufficiently firm to check any vibratory movement of shimmy.

In order to prevent the formation of bubbles or foam in the body of fluid in the casing 11, a hollow cover 49 is threadedly secured to the open top of the casing 11 so as to hold the top plate 26 in place and form a space 51 above the plate 26. In the top of each journal block 18 is formed a cavity 52 covered by the cover plate 26. Apertures 53 through the cover plate 26 connect the cavities 52 with the reservoir space 51. From the bottom of each cavity 52 extend passages 54 leading downwardly, one toward each side of the journal block 18 and into the respective compression chambers 29. Between the outlet 56 of each passage 54 is interposed a check valve, such as a ball valve 57, so as to be kept closed by the pressure from the chambers 29. When by reason of contraction or for some other reason oil pressure is reduced in the chamber 29 or in the casing 11, then the pressure of the oil from the reservoir space 51 lifts the check valve 57 off its seat and the chambers 29 are automatically refilled. In this manner the forming of air pockets or bubbles in the chambers 29 is obviated.

A central hub 58 extends upwardly from the cover plate 26 and around the shaft 33 of the piston 14. The hub 58 has holes 59 extended through its sides into the reservoir space 51. The hub 58 has such working clearance around the shaft 33 as to allow seapage under high pressure difference. There is also a working clearance between the top of the piston hub 19 and the cover plate 26, so that in case of undue expansion of oil or of increased pressure for other causes in the chambers 29, the oil is forced through said comparatively small clearances to the holes 59 and into the reservoir space 51.

It is to be noted that the motion checking device herein described when used as a shimmy dampener on automobiles is preferably connected by the arm 16 to the steering mechanism 17. In the preferred construction shown in Fig. 1 the arm 16 is interconnected between the steering mechanism and the steering rod 61. Namely the arm 16 is extended between abutments 62 which are preferably made of rubber or otherwise cushioned. Thus as the steering gear is turned it must turn the arm 16 and the piston 14 and the arm 16 moves the rod 61 to turn the wheels in the usual manner. It is also preferable to have the arm 16 substantially centrally located between the wheels of the automobile so as to take up shimmy equally from either side.

In the modified construction shown in Fig. 8 the arm 16 is connected directly to the wheel 63 by a suitably cushioned link 64 and the checking action acts directly on the wheel 63 and through the steering mechanism on the other wheel not shown.

Having thus described my invention what I now claim and desire to secure by Letters Patent is:

1. In a motion checking device, in combination a casing filled with fluid, a piston journalled in the casing, said casing being divided into compression chambers in the path of the piston, a by-pass chamber in the piston having openings communicating with each of said compression chambers, a sliding valve for covering and uncovering said openings, a valve stem adjustably held in said piston and being accessible from the outside of said casing and piston, a plurality of heat responsive elements yieldably held on the inner end of the valve stem so as to move in the direction of the outer end of the valve stem when expanded and supporting said valve on said valve stem so as to determine the position of said by-pass valve in accordance with the temperature of the fluid by-passed.

2. In a motion checking device, in combination a casing filled with fluid, a piston journalled in the casing, said casing being divided into compression chambers in the path of the piston, a by-pass chamber in the piston having openings communicating with each of said compression chambers, a sliding valve for covering and uncovering said openings, a valve stem adjustably held in said piston and being accessible from the outside of said casing and piston, a plurality of bimetallic discs yieldably held on the valve stem and supporting said valve on said valve stem so as to raise or lower the valve according to changes of temperature.

3. In a motion checking device, the combination with a piston oscillating in fluid compression chambers and having a by-pass chamber communicating with said compression chambers; of a by-pass valve mechanism, comprising, a sliding valve for covering the communicating passages of said by-pass chamber, a valve stem adjustably secured into said piston, and a plurality of heat responsive elements held on the end of the valve stem inside the communicating portion of the by-pass chamber so as to adjustably support said sliding valve on said stem.

4. The combination with the oscillating piston of a motion checking device having a plurality of compression chambers in the path of the piston movement and a by-pass chamber in the piston having intercommunicating passages for said compression chambers; of a valve stem extended through the piston from the outside into said by-pass chamber and being adjustably secured to said piston, heat-responsive means adjustably supported on the inner end of said valve stem in said by-pass chamber so as to expand in the direction of the outer end of said valve stem, and a sliding valve supported on said heat-responsive means so as to cover said by-pass passages in accordance with the position of the valve stem and of the expansion and contraction of said heat-responsive means.

5. The combination with the oscillating piston of a motion checking device having communicating compression chambers in the path of its piston movement and a by-pass chamber with by-pass passages for said intercommunication; of a valve stem adjustably secured into the piston, heat-responsive means supported on the inner end of the valve stem within said by-pass chamber, a sliding valve on the stem supported on said heat-responsive means so as to control the by-pass passages, and means on said valve stem to resiliently urge said valve against said heat-responsive means.

6. In a thermostatically controlled valve mechanism for use in hydraulic motion checking devices including a valve chamber connected by ports with high and low pressure chambers on the opposite sides of the piston of the motion checking device, a valve stem adjustably extended through the piston into said valve chamber, a valve slidable on said valve stem in said valve chamber so as to control said ports, and thermo-responsive means to slidably support said valve on said valve stem.

7. In a thermostatically controlled valve mechanism for use in hydraulic motion checking devices including a valve chamber connected by ports with high and low pressure chambers on the opposite sides of the piston of the motion checking device, a valve stem adjustably extended through said piston into said valve chamber, a valve slidable on said valve stem in said valve chamber so as to control said ports, thermo-responsive means to slidably support said valve on said valve stem, and means on the valve stem to resiliently hold said valve against said thermo-responsive means.

8. In a thermostatically controlled valve mechanism for use in hydraulic motion checking devices including a valve chamber connected by ports with high and low pressure chambers on the opposite sides of the piston of the motion checking device; a valve stem adjustably extended from the outside into said valve chamber, thermo-responsive elements on the end of said valve stem in said valve chamber, and a movable valve sleeve on said valve stem yieldably held on said thermo-responsive elements so as to control said ports.

9. In a thermostatically controlled valve mechanism for use in hydraulic motion checking devices including a valve chamber connected by ports with high and low pressure chambers on the opposite sides of the piston of the motion checking device; a valve stem adjustably extended from the outside into said valve chamber, a plurality of bimetallic discs yieldably held on the end of the valve stem in said valve chamber, a valve supported on said discs so as to be slidable with and relatively to said valve stem in said valve chamber to control said ports.

10. In a thermostatically controlled valve mechanism for use in hydraulic motion checking devices including a valve chamber connected by ports with high and low pressure chambers on the opposite sides of the piston of the motion checking device; a valve stem adjustably extended through the piston into said valve chamber, a plurality of heat-responsive discs yieldably held on the inner end of said valve stem in said valve chamber, a hollow valve supported on said discs so as to be slidable with and relatively to said valve stem in said valve chamber to control said ports, and resilient means on the valve stem to yieldably hold said valve against said discs.

11. The combination with the steering mechanism of a vehicle including a steering rod extended between the wheels of the vehicle, and a motion checking device on said vehicle having a movable element; of means of connection between said motion checking device and said steering rod comprising resiliently compressible spaced abutments extended from said steering rod, and an arm extended from the movable element of the motion checking device between said abutments so as to be moved by said abutment when the steering rod is moved in either direction.

HARRY D. NEWHART.